UNITED STATES PATENT OFFICE.

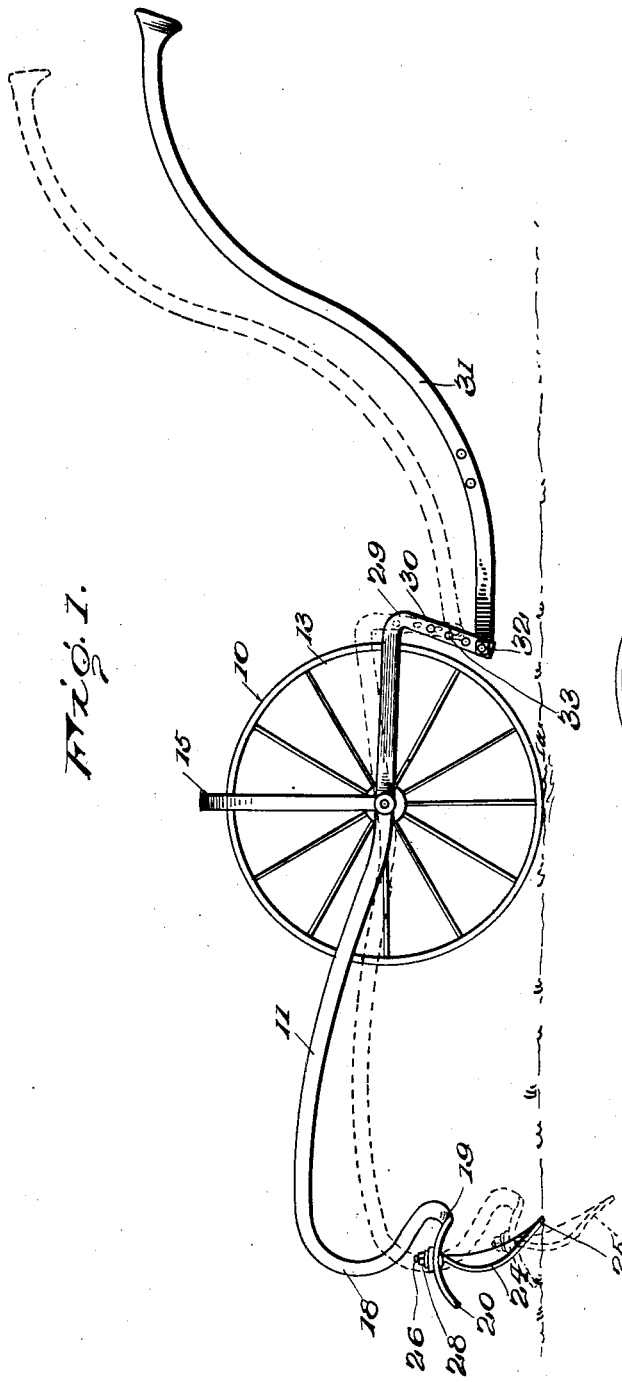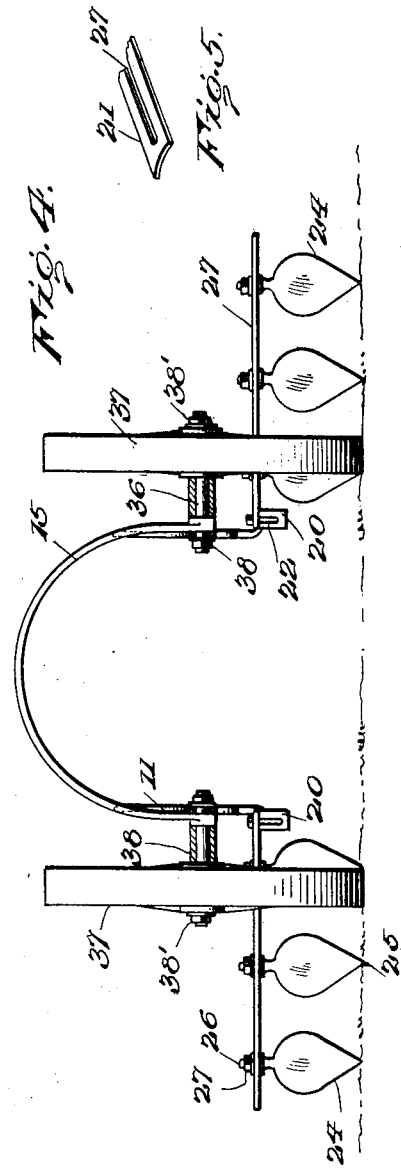

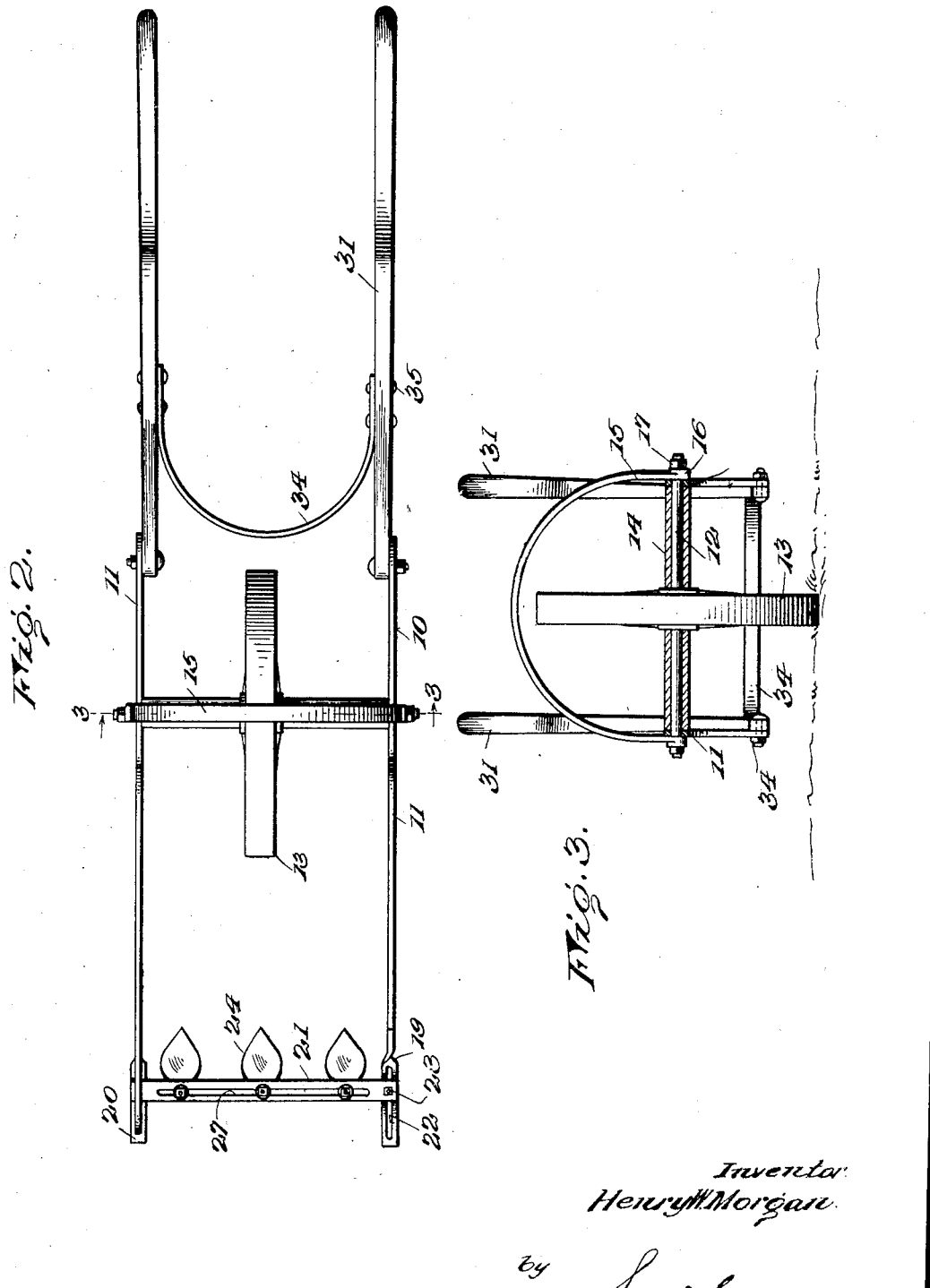

HENRY W. MORGAN, OF JOHNSON CITY, NEW YORK.

GARDEN-CULTIVATOR.

1,342,642.  Specification of Letters Patent.  Patented June 8, 1920.

Application filed September 6, 1919. Serial No. 322,133.

*To all whom it may concern:*

Be it known that I, HENRY W. MORGAN, a citizen of the United States, residing at Johnson City, in the county of Broome and State of New York, have invented certain new and useful Improvements in Garden-Cultivators, of which the following is a specification.

This invention relates to improvements in garden cultivators and more particularly to cultivators of the pull type.

An important object of this invention is to provide a cultivator of the pull type having novel means for adjusting the ground working members, whereby the same may be presented to the ground at various angles for penetrating the depth of the same.

A further object of the invention is to provide a cultivator of the character described having novel means for facilitating the release of the ground engaging elements from engagement with the ground at the completion of a furrow or when it is desired to clean the ground engaging elements.

A further object of the invention is to provide a garden cultivator of the pull type having novel means for adjustably connecting the handles of the same to the cultivator whereby the draft may be adjusted as desired.

A further object of the invention is to provide a garden cultivator of the character described which is efficient, of highly simplified construction and desirable in use.

Other objects and advantages of the invention will be apparent during the course of the following description.

In the accompanying drawings forming a part of this application and in which like numerals are employed to designate like parts throughout the same,—

Figure 1 is a side elevation of a garden cultivator embodying the invention,

Fig. 2 is a plan view of the cultivator,

Fig. 3 is a vertical transverse section taken on line 3—3 of Fig. 2,

Fig. 4 is a transverse section through the apparatus modified for use as a straddle row cultivator, Fig. 5 is a fragmentary perspective of the tooth supporting bar embodied in the invention.

In the drawings wherein for the purpose of illustration is shown several preferred embodiments of the invention, the numeral 10 generally designates the apparatus which is provided with a pair of longitudinally extending spaced parallel beams 11. As illustrated in Fig. 2 the beams 11 are connected intermediate their ends and at a point spaced forwardly from their centers by an axle 12 which in turn is supported by a wheel 13. A sleeve 14 is carried by the axle 12 on each side of the wheel and serves to space the wheel equal distances between the beams. An arch 15 of flat metal is provided at its end portions with journals 16 receiving the end portions of the axle and arranged on the outer sides of the beams. A fastening nut 17 is arranged on each end portion of the axle and serves to secure the several elements of the cultivator assembled. Each beam 11 is formed of flat metal and has its rear portion curved downwardly and inwardly as indicated at 18 and is provided with a half twist as indicated at 19 for arranging the flat sides of the rear terminals of the beams horizontally.

The portions of the beams rearwardly of the twisted portions 19 form attaching arms or brackets 20 to which is connected the end portions of a tooth supporting bar 21. As illustrated in Figs. 1 and 2, the attaching brackets 20 are arcuate and are provided with longitudinally extending elongated slots 22 which receive fastening bolts 23 carried by the bar 21. By loosening the bolts 23, the bar 21 may be adjusted longitudinally of the brackets for varying the angle at which a plurality of teeth 24 are presented to the ground.

As illustrated in Fig. 1, the ground engaging members are concavo-convex and have their forward end portions pointed as indicated at 25 for penetrating the ground. The rear end portions of the ground engaging members are provided with shanks 26 extended through an elongated slot 27 in the bar 21 and are secured in position by bolts 28. The teeth or ground engaging members 24 may be positioned desired distances apart for providing the desired space between the furrows and any number of ground engaging elements may be attached to the bar 21.

The forward portions of the beams 11 are bent downwardly at an obtuse angle as indicated at 29 for providing handle attaching arms 30. A handle 31 is connected to each arm 30 through the medium of a bolt 32 which may be passed through any one of a plurality of openings 33 in the arm. As illustrated in Fig. 2, the arms 31 are rigidly connected intermediate their ends by a U-shaped arm 34 secured to the handles by suitable fastening devices 35. The handles 31 are curved longitudinally as illustrated in Fig. 2 for presenting the rear end portions of the same to a point where one may readily grasp the same for pulling the cultivator.

Assuming that it is desired to cause the ground working members to penetrate the ground for a large portion of their length, the handles may be connected to the lower portions of the arms 30 whereby the rear portions of the beams will be swung downwardly for forcing the blades deeply into the ground.

In the event that but a small penetrating depth for the ground working members is desired, the handles may be attached to the upper portions of the arms so as to elevate the rear portions of the beams and thus decrease the penetrating depth of the ground working members.

When it is desired to release the ground working elements from the ground, a downward pressure is exerted on the arms 30 whereby the rear portions of the beams are elevated. The upward movement of the rear portions of the beams causes the ground working members to move rearwardly in an arcuate path about the axis of the axle 12. This movement of the ground working members in an arcuate path permits them to be readily removed from engagement with the ground as they travel along the line of the least resistance.

As illustrated in Fig. 4, the cultivator may be readily modified for providing a cultivator of the straddle row type. In this form of the invention, the arch 15 is journaled to a pair of outwardly extending stub axles 36 upon which are mounted a pair of wheels 37. A sleeve 38 is mounted on each stub axle between the connecting arch and the inner side of the adjacent wheel hub. The beams 11 are arranged inwardly of the sides of the arched support 15 and are mounted on the inner end portions of the stub axles 36. Suitable fastening devices 38' have engagement with the ends of the stub axles and are adapted for securing the wheels and the beams in position on the axles. When it is desired to use the device as a straddle row cultivator, an additional bar 27 is provided and each bar is connected at one end portion to the arcuate attaching bracket 20. The bars 27 extend outwardly from the brackets 20 as illustrated and may be adjusted about an arc for varying the angle at which the ground operating members are presented to the ground.

In the practice of the invention, the bar 27 is secured in an adjusted position to the arcuate attaching brackets 20 for presenting the ground working members to the ground at the desired angle. When the end of a row has been reached, the ground working members are released from the ground by exerting a downward pressure on the downwardly and inwardly inclined arms 30.

As the axle 12 is connected to the beams at a point forwardly of the center of the same, an increased leverage is exerted on the forward portion of the beam whereby the ground engaging members may be readily withdrawn from the ground.

The obtuse angle of the arms 30 permit the ground working members to be entirely withdrawn without the lower end portions of the arms 30 striking the ground. When it is desired to vary the penetrating depth of the ground working members, the handles may be attached to the proper openings 33 in the arms whereby the rear portions of the beams may be either elevated or lowered. In operating the cultivator, one stands between the handles and grasps the rear portions of the same and pulls the cultivator from the ground to be worked.

It is to be understood that the form of the invention herewith shown and described is to be taken as a preferred example of the same and that such minor changes in arrangement and construction of parts may be made as will remain within the spirit of the invention and scope of what is claimed.

Having thus described the invention, what is claimed is:

1. A cultivator including an axle, a pair of beams pivoted intermediate their ends to said axle, means to support said axle, ground-working devices carried by the rear ends of said beams, the forward end portions of said beams being extended downwardly and inwardly, and handles connected to the downwardly and inwardly extended forward end portions of said beams and being adjustable vertically of the same, whereby the position of said beams may be regulated for varying the penetrating depth of said ground-working devices.

2. A cultivator including an axle, a pair of beams horizontally pivoted intermediate their ends to said axle and having their forward end portions extended downwardly and inwardly, ground-working devices carried by the rear ends of said horizontally pivoted beams, draft handles connected to the downwardly and inwardly extended forward end portions of said beams, and an arched brace extending over said wheel and having its end portions apertured for receiving the ends of said axle, the apertured end portions of said arched brace being arranged outwardly of said beams.

3. A cultivator including a pair of beams formed from flat metal having their rear end portions provided with half twists thereby forming brackets, and ground-working devices associated with said brackets.

4. A cultivator including a pair of beams formed from flat metal having their rear portions extended downwardly and inwardly and provided with half twists at points spaced from their rear ends, thereby forming a pair of attaching brackets, ground-working devices associated with said brackets, and means to support said beams.

5. A cultivator including a pair of beams formed from flat metal having their rear end portions provided with a half twist thereby forming a pair of attaching brackets having their flat surfaces horizontally arranged, said attaching brackets being curved longitudinally, a bar adjustably connected to said longitudinally curved brackets, and a plurality of ground working members connected to said bar.

6. A cultivator including a pair of beams, arcuate attaching brackets carried by the rear ends of the beams and provided with longitudinally extending slots, a transversely extending bar having its end portions mounted upon said brackets, fastening devices extending through said slots and the adjacent portions of said bars, and ground working members carried by said bar.

7. A cultivator including a pair of beams formed from flat metal having their rear portions bent downwardly and inwardly and provided with a half twist at a point spaced from their rear ends thereby forming a pair of attaching brackets, said attaching brackets being curved longitudinally, a transversely extending bar connected to said longitudinally curved brackets, and ground working members carried by said bar, said bar being adapted to be adjusted longitudinally of said brackets for varying the angle of said ground working members.

8. A cultivator including a pair of beams, means to support the beams, arcuate attaching brackets carried by the rear ends of said beams, a transversely extending bar adjustably connected to said attaching brackets and a plurality of ground working members carried by said bar, said bar being adapted to be adjusted longitudinally of said arcuate portions for varying the angle of said ground working members.

9. A cultivator including a pair of beams, an axle connecting the beams, an arched brace connecting the ends of the axle and arranged outwardly of said beams, a plurality of ground working members carried by the rear end portions of said beams, and handles adjustably connected to the forward ends of the beams.

10. A cultivator including a beam, an arcuate attaching bracket carried by the rear portion of the beam and having a longitudinally extending slot therein, a bar adjustably connected to said arcuate bracket, and a plurality of ground working members carried by said bar.

In testimony whereof I affix my signature.

HENRY W. MORGAN.